US008489460B2

(12) United States Patent
Kamath

(10) Patent No.: US 8,489,460 B2
(45) Date of Patent: *Jul. 16, 2013

(54) METHOD AND APPARATUS FOR ADVERTISING BIDDING

(75) Inventor: Anil Kamath, Palo Alto, CA (US)

(73) Assignee: Adobe Systems Incorporated, San Jose, CA (US)

(*) Notice: Subject to any disclaimer, the term of this patent is extended or adjusted under 35 U.S.C. 154(b) by 136 days.

This patent is subject to a terminal disclaimer.

(21) Appl. No.: 12/973,680

(22) Filed: Dec. 20, 2010

(65) Prior Publication Data

US 2011/0087542 A1 Apr. 14, 2011

Related U.S. Application Data

(63) Continuation-in-part of application No. 10/773,653, filed on Feb. 6, 2004, now Pat. No. 7,870,017, and a continuation-in-part of application No. 12/884,828, filed on Sep. 17, 2010.

(60) Provisional application No. 60/450,597, filed on Feb. 26, 2003, provisional application No. 61/243,873, filed on Sep. 18, 2009.

(51) Int. Cl.
*G06Q 10/00* (2012.01)

(52) U.S. Cl.
USPC .................................... 705/14.71

(58) Field of Classification Search
USPC .......................... 705/14.71, 14.69
See application file for complete search history.

(56) References Cited

U.S. PATENT DOCUMENTS

| 6,199,050 | B1* | 3/2001 | Alaia et al. ...................... 705/37 |
| 6,285,987 | B1 | 9/2001 | Roth et al. |
| 6,408,283 | B1 | 6/2002 | Alaia et al. |
| 6,499,018 | B1 | 12/2002 | Alaia et al. |
| 6,792,399 | B1 | 9/2004 | Phillips et al. |
| 6,907,566 | B1 | 6/2005 | McElfresh et al. |
| 7,035,812 | B2* | 4/2006 | Meisel et al. ............... 705/14.54 |
| 7,065,500 | B2* | 6/2006 | Singh et al. .................. 705/26.1 |
| 7,363,300 | B2* | 4/2008 | Davis et al. ............................ 1/1 |
| 7,406,436 | B1* | 7/2008 | Reisman ...................... 705/7.32 |
| 7,870,017 | B2 | 1/2011 | Kamath |
| 2003/0220866 | A1 | 11/2003 | Pisaris-Henderson et al. |
| 2004/0167816 | A1 | 8/2004 | Kamath |
| 2004/0225562 | A1 | 11/2004 | Turner et al. |
| 2005/0144068 | A1 | 6/2005 | Calabria et al. |
| 2005/0216516 | A1 | 9/2005 | Calistri-Yeh et al. |

(Continued)

FOREIGN PATENT DOCUMENTS

| JP | 2003216864 A | 7/2003 |
| WO | 0103041 A1 | 1/2001 |
| WO | 2004084109 A1 | 9/2004 |

OTHER PUBLICATIONS

Final Office Action in related U.S. Appl. No. 12/884,828, dated Feb. 14, 2013, 51 pages.

(Continued)

*Primary Examiner* — Thomas L Mansfield, Jr.
(74) *Attorney, Agent, or Firm* — Kilpatrick Townsend & Stockton LLP

(57) ABSTRACT

Methods, articles, and systems for determining a bidding strategy for on-line query answer set or contextual advertisement positions for marketing options is described herein.

24 Claims, 4 Drawing Sheets

U.S. PATENT DOCUMENTS

| | | |
|---|---|---|
| 2007/0100708 A1 | 5/2007 | Smith et al. |
| 2007/0255690 A1 | 11/2007 | Chang et al. |
| 2008/0010144 A1 | 1/2008 | Chatwin et al. |
| 2008/0097830 A1* | 4/2008 | Kim .................................. 705/10 |
| 2008/0103892 A1 | 5/2008 | Chatwin et al. |
| 2008/0114639 A1 | 5/2008 | Meek et al. |
| 2008/0249844 A1 | 10/2008 | Abe et al. |
| 2008/0255915 A1 | 10/2008 | Collins et al. |
| 2009/0055139 A1 | 2/2009 | Agarwal et al. |
| 2009/0327083 A1 | 12/2009 | Mathew et al. |
| 2010/0138291 A1 | 6/2010 | Silverman et al. |
| 2010/0257058 A1 | 10/2010 | Karidi et al. |
| 2010/0306161 A1 | 12/2010 | Chen et al. |
| 2011/0087542 A1 | 4/2011 | Kamath |
| 2012/0036009 A1 | 2/2012 | Aronowich et al. |

OTHER PUBLICATIONS

Lee et al. "Analysis and Visualization of Metrics for Online Merchandising", WEBKDD '99, LNAI 1836, pp. 126-141, 2000.

Ward et al. "Internet Shopping, Consumer search and Product Brandling", Department of Agricultural and Consumer Economics, University of Illinois, Urbana-Champaign, Jul. 1999.

International Search Report for Application PCT/US2010/049332, mailed Jun. 3, 2011.

Non Final Office Action in related U.S. Appl. No. 13/618,827 dated Nov. 30, 2012, 40 pages.

International Search Report from PCT/US2011/065995, dated Aug. 24, 2012, Adobe Systems Incorporated, pp. 1-11.

* cited by examiner

Budget/Revenue Relationship
Visualization 210 ns denote# METHOD AND APPARATUS FOR ADVERTISING BIDDING

RELATED APPLICATIONS

This application is a continuation-in-part of U.S. patent application Ser. No. 10/773,653, filed Feb. 6, 2004, titled "Method and Apparatus for Position Bidding," which claims the benefit of U.S. Provisional Application No. 60/450,597, filed on Feb. 26, 2003, titled "Method and Apparatus for On-Line Query Answer Set Position Bidding," and also a continuation-in-part of U.S. patent application Ser. No. 12/884,828, titled "Advertisee-History-Based Bid Generation System and Method for Multi-Channel Advertising," filed Sep. 17, 2010, which claims the benefit of U.S. Provisional Application No. 61/243,873, filed Sep. 18, 2009, titled "Modeling and Optimal Bidding in a Real-Time Multi-Channel, Online Advertising Environment"; each of the aforementioned applications are herein incorporated by reference in their entirety.

TECHNICAL FIELD

The present invention relates generally to the fields of data processing and electronic advertising. More specifically, the present invention relates to on-line query answer set or contextual advertisement position bidding. On-line query answer set may also be referred to as on-line search result answer/return set.

BACKGROUND OF THE INVENTION

In conventional systems, marketing purchases (also referred to as advertisement buys) are typically optimized individually and performance measurement and purchase decisions are made separately for each marketing option. An organization can have a large number of available marketing options (advertisement buys) that are priced differently, and deliver different results. For example, search engines have paid listings, where the cost per click to bring a visitor from the search engine is different based on the keyword that the visitor on the search engine searched for and the position at which the advertisement is displayed. Similarly, most web sites have different charges for different contextual advertisement positions or for different audiences that are shown the advertisements.

Thus, an approach that enables a decision maker to make marketing purchase (advertisement buy) decisions, by allocating dollars across a portfolio of marketing options (advertisement buys) so as to meet specific composite goals and performance criteria, is desirable.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Embodiments of the present invention includes a system and its components that enable a decision maker to make marketing purchase (advertisement buy) decisions, by allocating dollars across a portfolio of marketing options (advertisement buys) so as to meet specific composite goals and performance criteria.

In the description to follow, embodiments of the present invention will be described using terminologies commonly employed by those skilled in the art to present their work, including but not limited to terms like web site, web pages, clicks, on-line query, search engine, answer set, modeling, regression analysis, optimization, objective functions, constraints, and so forth. These terms are to be accorded the common meaning as understood by those of the ordinary skill in the arts of information technology and applied mathematics.

Process Flow

In one embodiment, the process of the present invention may comprise the following operations:

Model

Optimize

Execute

Figure 1:
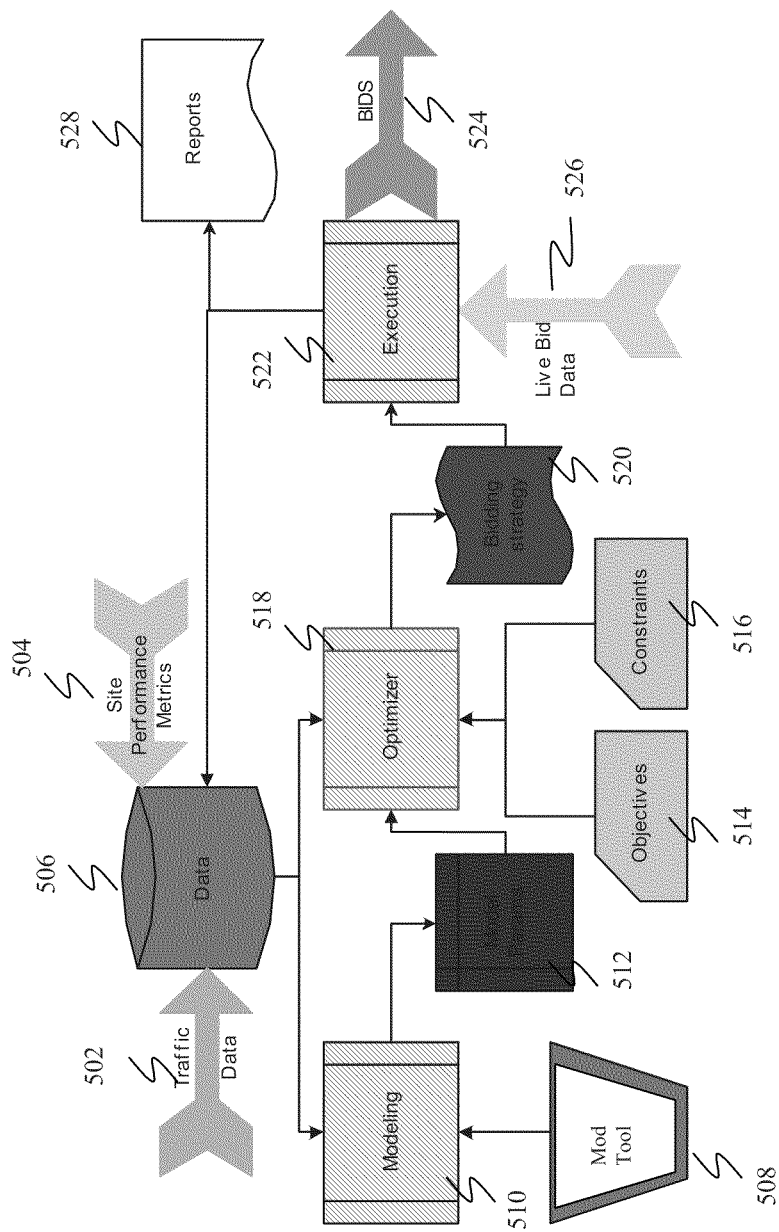
FIG. 1 is an overview illustrating the present invention according to one embodiment.

Each aspect will be described in turn, referencing FIG. 1.

Model

In one embodiment, the system may include modeling 510 for the different marketing options (advertisement buys) available to an organization. The modeling parameters 512 may include, but are not limited to a number of visitors, a cost of bringing the visitors, number of unique visitors, transactions, revenues generated by the visitors, and so forth. In various embodiments, the modeling parameters may also include information about visitors who may view the marketing options, such as, for example, demographic information, interests and likes, or behavioral information. In various embodiments, demographic information may include information such as age, gender, geographic location, employment, education, and/or membership in one or more groups. Thus, in various embodiments, bidding strategies which are based on models including demographic information may direct bids which maximize impressions by visitors that satisfy particular a demographic makeup. For example, a bidding strategy may seek to maximize impressions by residents of Los Angeles, or students at UCLA, or males between 18 and 34 years of age. In other embodiments, bidding strategies which are based on models including demographic information may direct bids which recognize value provided by showing advertisements to different demographic groups. For example, a bidding strategy may seek to maximize impressions by males between 18 and 34 years of age for a particular video game product, because the model incorporates knowledge that this group of viewers are more likely to cause a conversion than other groups. In other embodiments, the modeling parameters may include unique identifying information about one or more visitors. The models may comprise be statistical models based on measurable empirical data 506.

In one embodiment, the models are constructed by gathering empirical data 506 by purchasing the various marketing options for a limited period of time, and measuring the resulting clicks, visitors, transaction, revenues, and so forth 502 and 504. In various embodiments, the information may be tracked on a per-visitor basis that it may be combined with information identifying visitors or visitor demographics. Further, for the embodiment, a least mean squared fit over the empirical data may be performed to determine the expected values of the model parameters 512, using a modeling software 508 like AMPL (a modeling language for linear programming) or Splus (software for statistical modeling). For example, for the paid listings on search engines like Overture and Google, empirical data for different keywords at different positions may first be obtained, and then the ratio of clicks at position i to clicks at position i+1 through a least mean squared regression may be determined. Using this model, the traffic that can be generated at different positions and/or for different keywords may be inferred.

In various embodiments, models may be specified to determine model objectives for multiple sites or auctions. Thus, in some embodiments, a model may be used to determine different bidding strategies for different websites. In various embodiments, a model may comprise empirical data for multiple web sites in addition to data for particular positions within websites. Thus, a bidding strategy produced by solving an objective function for a model may produce different bid amounts for different web sites or auctions depending on those web sites' or auctions' ability to fulfill objectives, such as revenue, conversion rates, and others, as described herein. The bidding strategy may therefore result in bids for marketing options which are placed in different positions on different web sites. In various embodiments, models may be used to determine different bidding strategies for different audiences (e.g., viewers of advertisements may be differentiated based on their demographic information, interests, likes, and/or past behaviors). In some embodiments audience models may be combined with models for websites to determine different bidding strategies for different audiences seeing the ads at different websites.

In various embodiments, the models may include a click model that may forecast the number of clicks for the various on-line query answer set or contextual advertisement positions available from various search engines and/or web sites. Embodiments may include a cost model that may forecast costs of ad impressions or clicks for various audiences or websites and models. In various embodiments, the cost model may predict how different bid levels may result in different levels of spending on different audiences or websites due to different numbers of impressions and clicks on those audiences or websites. In other embodiments, models may include a revenue model that forecasts revenue based at least in part on click conversion. In various embodiments, models may include a model which forecasts conversions from clicks to purchases.

Optimize

In one embodiment, once the models for the different variables that are within the scope to improve or control, the models 510 may be specified to perform an optimization of measurable objectives 514 that have been modeled. In various embodiments, the measureable objectives may include number of unique visitors, number of transactions, revenues, profits, conversions, etc. In some embodiments, objectives may be generated by using some combination of marketing options. The specification may be effectuated through a variety of input techniques. In various embodiments, a graphical user interface is provided to specify the models 510, or more specifically, the model parameters and their relationships 512. The optimization of these objectives 514 may be subject to constraints 516 that involve controlling some other measurable modeled variables such as the money spent on marketing, certain minimum lead generation requirements, etc.

In various embodiments a graphical user interface may be configured to allow changes to model parameters, followed by re-optimization. Thus, a user of the graphical user interface may see be able to see changes to a bidding strategy take place dynamically as the user changes one or more model parameters. In various embodiments, these changes may be performed by repeating optimization of the model with the changed parameters.

The optimization problem may be modeled as a mathematical programming problem. In some embodiments, if all the models involved are linear models the optimization problem is a linear programming problem, which can be solved using a standard linear programming/optimization solver like CPLEX or MINOS 518. In other embodiments, the optimization problem may be formulated as a non-linear problem, and solved employing any one of a number of non-linear optimization techniques. The solution to the optimization problem can be a set of marketing purchase decisions or a market budget allocation strategy (also referred to as a bidding strategy) 520 that needs to be executed by the organization.

In various embodiments, the optimization may be performed with reference to a specific visitor or instance of a web site or auction. For example, in various embodiments, an optimization may be performed in response to a visitor requesting to view a website. In various embodiments, the optimization may then be performed in real time to determine a bidding strategy with respect to the particular visitor performing the request and/or the particular web site being requested.

Objective Functions

In various embodiments, the measurable goals (or objectives) 512 that may be used may be one or more of the following:

maximizing traffic (also referred to as clicks) for the marketing options for a given budget;

minimizing cost to get certain traffic for the marketing options;

minimizing customer or visitor acquisition cost for the products or services of the marketing options;

maximizing revenues for the products or services of the marketing options;

maximizing profits for the products or services after as a net of cost of the marketing options;

maximizing profit margins for the products or services as a net of cost of the marketing options;

minimizing marketing expenses for the marketing options;

maximizing increases of customer sign-ups or registrations for products or services of the marketing options;

minimizing cost measured on a per-conversion or per-purchase basis;

maximizing number of impressions that may be obtained by visitors which satisfy a given demographic makeup; and maximizing engagement with an advertisement or brand (e.g., getting "likes" on Facebook, "tweets" about the brand on twitter, views of the video ads etc.).

In alternate embodiments, other objective functions 512 may be employed in addition to or in lieu of the earlier enumerated objective functions.

Constraints

In various embodiments, constraints may be set and differing levels of granularity, from cost-per-conversion numbers, to budgets for entire advertising channels. In various embodiments, the measurable constraints on the marketing decisions may be one or more of the following enumerated constraints:

traffic to certain URLs (Uniform Resource Locators) should exceed certain amount during a certain period;

certain keywords should be at specified positions;

costs per click should not exceed a certain amount;

costs per conversion should not exceed a certain amount;

user acquisition costs should be below certain amount;
marketing expenses for the marketing options should be below a budget limit;
expenses for other marketing options or advertising channels other than those which are being optimized for is set at a particular limit;
revenues generated for products or services of the marketing options should be below a limit; and
profit margins net of marketing costs should be above a certain limit.

In alternative embodiments, measurable constrains may comprise other constraints in addition to or in lieu of the earlier enumerated constraints.

Execute

In various embodiments, the marketing strategy or spending decisions (bidding strategy) 520 may be implemented 522 to make bids 524. The implementation may also be monitored and adjusted 522 in the context of the changing marketing options available 526 and the changing objectives and requirements of the organization 514 and 516 (re-performing the earlier described optimization operation). For example, based on the availability of cheaper marketing options 526, a decision may be made to stop an advertising campaign at a specific site or for paid listings on search engines, the bid or the maximum cost per click that an organization presumably is willing to pay for a paid listing for a keyword, may be changed, based on the gross margins generated from transactions made by visitors clicking on that keyword listing. In various embodiments, the results of the implementations are captured as reports 528, and the data contained in the reports 528 are fed back to add to or update the empirical data employed to build the models 510. The models 510 may be updated, and inputs and/or constraints changed, and the optimization process 518 may be re-performed to yield one or more new bidding strategies 520.

Figure 2:
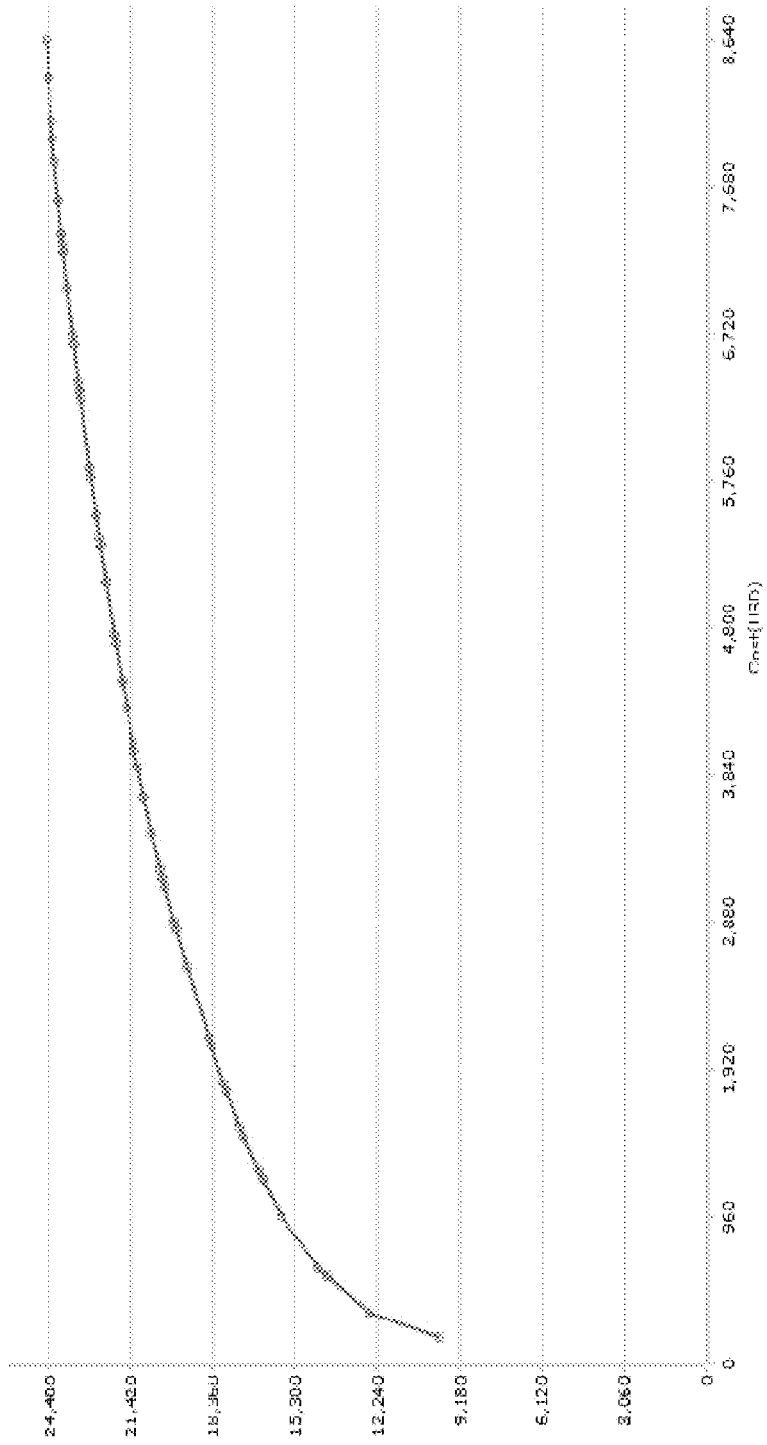
FIG. 2 is a example visualization of predicted revenue according to different budget allocations.

In various embodiments, bidding strategies and/or objective values obtained by finding solutions to objective functions may be output to a user in the form of a visualization. In various embodiments, multiple solutions to the objective problem may be generated based on changing inputs or changing constraints. For example, FIG. 2 illustrates an example visualization of predicted revenue based on various budget amounts. The budget/revenue relationship visualization 210 may show an advertiser what revenue is predicted for the advertiser based on various advertising budget amounts. Thus, in the example illustrated, predicted revenue increases as advertising budgets increase. However, the relationship may not be linear, as illustrated, for example, in FIG. 2. In alternative visualizations, different bidding strategies may be displayed based on changes to inputs or constraints.

Figure 3:
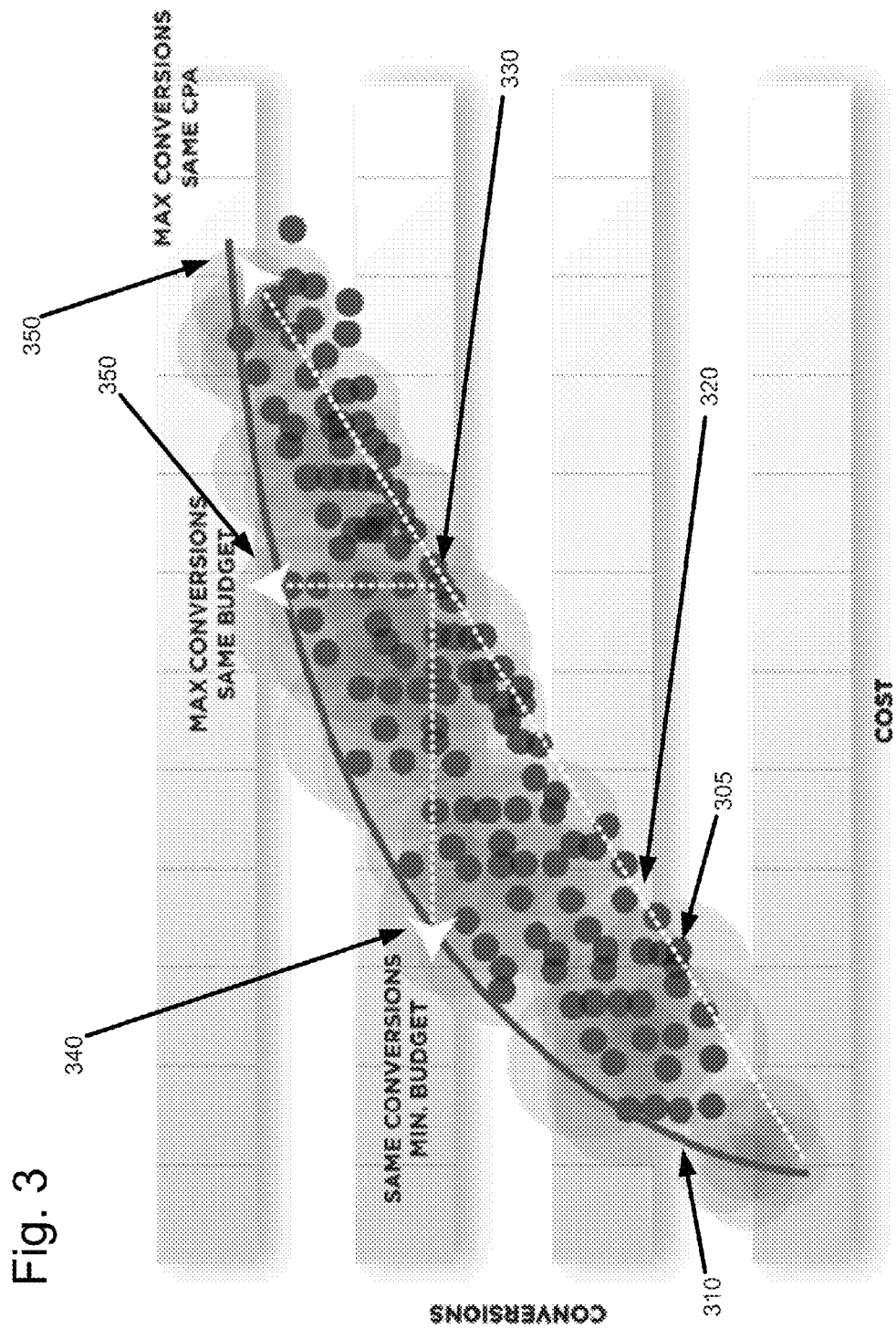
FIG. 3 is an example visualization of predicted conversions according to different budget allocations.
Figure 4:
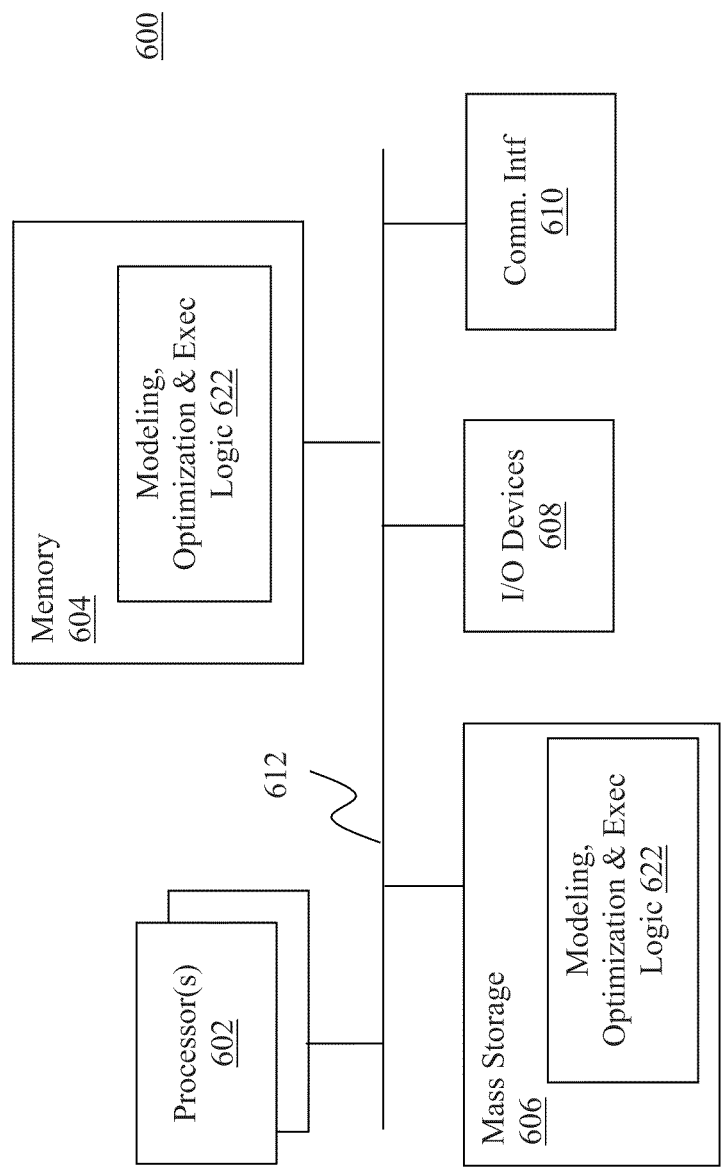
FIG. 4 is a block diagram illustrating a computing device suitable for use to practice the present invention.

In another Example, FIG. 3 illustrates an example visualization of predicted conversions based on various budget amounts. The cost to conversion relationship, represented by line 310 shows a relationship that is non-linear, as differentiated from the linear relationship 320, which shows a constant cost-per-conversion relation, also known as "CPA". In between the two illustrated relationships are various points predicting pairs of conversion rates and cost, such as point 305. As the visualization of FIG. 3 illustrates, in various embodiments, a user may be shown how changes made using the bidding strategy generation techniques described herein may result in different benefits to an advertiser. For example, starting from a point 330 on the constant cost-per-conversion line 320, a bidding strategy may be generated that minimizes an advertiser's budget while maintaining the same number of conversions. This would result in the a conversion level that is represented by point 340. Conversely, a bidding strategy may be generated that, for a constant budget, increases conversions, such as at point 350. In another example, a bidding strategy may be generated that, increases conversions as much as possible while maintaining a constant CPA, such as at point 360. In alternative visualizations, different bidding strategies may be displayed based on changes to inputs or constraints.

Making A Market In Marketing

The present invention may also be employed to create a market in marketing options, where sites ("the sellers"), with marketable visitors can ask varying rates for different advertising options and the organizations that need those visitors ("the buyers") bid different prices for the different options depending on the value they associate with the visitor. An entity can then play the role of the market maker in such a market by matching the buyers with the sellers for a commission.

The market maker can match buyers and sellers by simply presenting the various options to the buyers and sellers and let them make their decisions individually. The market also supports the role of a broker, who can also take the objectives of one or multiple sellers to optimize their marketing objectives for a commission. For paid listings on search engines, the price for a click from a certain position on the search results page for a certain keyword depends on the price that different "buyers" are willing to bid for that position. This can sometimes create bidding wars between buyers that result in the buyers collectively paying a high price for their clicks. A broker, by pulling together the different competing buyer entities, can collectively optimize the different objectives and requirements thereby providing a lower cost solution to the buyers that meet the buyers' objectives.

Exemplary System

FIG. 3 illustrates an example computing system/device suitable for use to practice the present invention, in accordance with one embodiment. As shown, computing system/device 600 includes one or more processors 602, and system memory 604. Additionally, computing system/device 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown).

Each of these elements performs its conventional functions known in the art. In particular, system memory 604 and mass storage 606 may be employed to store a working copy and a permanent copy of the programming instructions implementing one or more aspects of the earlier described teachings to practice the present invention, i.e. the modeling, the optimization, the bidding and so forth. The programming instructions may be implemented in assembler instructions supported by processor(s) 602 or high level languages, such as C, that can be compiled into such instructions. The communication to place the bids may be implemented in any one of a number of proprietary or open communication/transaction protocol, including but are not limited to HTTP and TCP/IP.

The permanent copy of the programming instructions may be placed into permanent storage 606 in the factory, or in the field, through e.g. a distribution medium (not shown) or through communication interface 610 (from a distribution server (not shown)).

Except for the modeling, optimization, and bidding logic, the constitution of these elements 602-612 are known, and accordingly will not be further described.

Epilog

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A method for determining a bidding strategy to be used when buying advertising by placing one or more bids for a plurality of marketing options, the method comprising:
   facilitating, by a computing device, prior to placement of one or more bids, specification of one or more models that model one or more performance parameters for the plurality of marketing options;
   receiving, by the computing device, indications of one or more constraints;
   determining, by the computing device, prior to placing the one or more bids, a bidding strategy wherein:
     the bidding strategy directs allocation of monetary resources to place the one or more bids among the plurality of marketing options; and
     determining comprises solving, by the computing device, an objective function configured to optimize at least one performance parameter for the plurality of marketing options using the specified one or more models, wherein solving the objective function comprises solving, by the computing device, the objective function subject to the one or more constraints; and
   after determining the bidding strategy, outputting, by the computing device, the determined bidding strategy for use in placing the one or more bids among the marketing options.

2. The method of claim 1, wherein facilitating specification of one or more models comprises, facilitating, by the computing device, specification of a model configured to model the one or more performance metrics based at least in part on information about visitors targeted for the marketing options.

3. The method of claim 2, wherein the model is configured to model the one or more performance metrics based at least in part on demographic information about the visitors targeted for the marketing options.

4. The method of claim 1, wherein facilitating specification of one or more models comprises, facilitating, by the computing device, specification of a model configured to model the one or more performance metrics based at least in part on an identity of a visitor targeted for the marketing options.

5. The method of claim 4, wherein the determining the bidding strategy comprises determining, by the computing device, the bidding strategy with reference to a web page and a visitor in response to the visitor requesting to view the web page.

6. The method of claim 1, wherein facilitating specification of one or more models comprises facilitating, by the computing device, specification of a model configured to model the one or more performance metrics based at least in part on a plurality of advertising positions occupied by the marketing options.

7. The method of claim 6, wherein:
   facilitating specification of the model comprises facilitating, by the computing device, specification of a model configured to model the one or more performance metrics based at least in part on a plurality of advertising positions on multiple web sites; and
   the output bidding strategy directs bids to marketing options which are placed at different advertising positions on different web sites.

8. The method of claim 6, wherein the plurality of advertising positions occupied by the marketing options are modeled as responsive to monetary resources allocated to the one or more bids placed among the marketing options.

9. The method of claim 6, wherein the plurality of advertising positions are positions occupied by the marketing options in a selected one of on-line query answer sets and contextual advertisements.

10. The method of claim 1, wherein outputting the determined bidding strategy comprises generating, by the computing device, one or more visualizations describing the bidding strategy.

11. The method of claim 10, wherein generating one or more visualizations comprises generating, by the computing device, visualizations which show a first objective value determined through a first solution to the objective function solved subject to a first constraint and a second objective value determined through a second solution solved subject to a second constraint.

12. The method of claim 11, wherein generating one or more visualizations comprises generating one or more curves showing how objective values change as constraints change.

13. The method of claim 11, wherein determining the bidding strategy subject to the one or more constraints comprises determining the bidding strategy subject to a constraint requiring a cost limit for a cost-per-conversion measure.

14. The method of claim 11, wherein determining the bidding strategy subject to the one or more constraints comprises determining the bidding strategy subject to a constraint requiring a cost limit for expenditures on an advertising channel.

15. An article of manufacture comprising a tangible, non-transitory computer-readable medium having instructions stored thereon that, responsive to execution by a computing device, cause the computing device to perform operations comprising:
   facilitating, prior to placement of one or more bids for buying advertising, specification of one or more models that model one or more performance parameters for a plurality of marketing options, wherein facilitating specification of one or more models comprises facilitating specification of a model configured to model the one or more performance metrics based at least in part on demographic or identifying information about visitors targeted for the marketing options and based at least in part on a plurality of advertising positions on multiple web sites;
   determining, prior to placing the one or more bids, a bidding strategy wherein the bidding strategy directs allocation of monetary resources to place the one or more bids among the plurality of marketing options; and
   after determining the bidding strategy, outputting the determined bidding strategy for use in placing the one or more bids among the marketing options, wherein the output bidding strategy directs bids to marketing options which are placed at different advertising positions on different web sites.

16. The article of claim 15, wherein the bidding strategy directs allocation of monetary resources to place the one or more bids among the plurality of marketing options; and wherein determining comprises solving an objective function configured to optimize at least one performance parameter for the plurality of marketing options using the specified one or more models.

17. The article of claim 15, wherein outputting the determined bidding strategy comprises generating one or more visualizations describing the bidding strategy.

18. The article of claim 16, wherein the operations further comprise receiving indications of one or more constraints; and wherein:
solving an objective function comprises solving the objective function subject to the one or more constraints; and
generating one or more visualizations comprises generating visualizations which show a first objective value determined through a first solution to the objective function solved subject to a first constraint and a second objective value determined through a second solution solved subject to a second constraint.

19. An apparatus, comprising:
one or more computer processors;
memory, coupled to the one or more computer processors, containing programming instructions, which, when executed on the one or more computer processors, cause the apparatus to:
facilitate, prior to placement of one or more bids for buying advertising, specification of one or more models that model one or more performance parameters for a plurality of marketing options, wherein facilitating specification of one or more models comprises facilitating specification of a model configured to model the one or more performance metrics based at least in part on a plurality of advertising positions on multiple web sites;
determine, prior to placing the one or more bids, a bidding strategy wherein the bidding strategy directs allocation of monetary resources to place the one or more bids among the plurality of marketing options, wherein determine comprises solve, by the computing device, an objective function configured to optimize at computing device, an objective function configured to optimize at least one performance parameter for the plurality of marketing options using the specified one or more models; and
after determining the bidding strategy, output the determined bidding strategy for use in placing the one or more bids among the marketing options, wherein the output bidding strategy directs bids to marketing options which are placed at different advertising positions on different web sites.

20. The apparatus of claim 19, wherein facilitate specification of one or more models comprises facilitate specification of a model configured to model the one or more performance metrics based at least in part on demographic or identifying information about visitors targeted for the marketing options.

21. The apparatus of claim 19, wherein determine comprises generate a solution for an objective function configured to optimize at least one performance parameter for the plurality of marketing options using the specified one or more models.

22. The apparatus of claim 19, wherein output the determined bidding strategy comprises generate one or more visualizations describing the bidding strategy.

23. The apparatus of claim 22, wherein the apparatus is further caused to receive indications of one or more constraints; and wherein:
determine comprises generate one or more solutions to an objective function configured to optimize at least one performance parameter for the plurality of marketing options using the specified one or more models, subject to the one or more constraints; and
generate one or more visualizations comprises generating visualizations which show a first objective value determined through a first solution to the objective function solved subject to a first constraint and a second objective value determined through a second solution solved subject to a second constraint.

24. The method of claim 6, wherein:
facilitating specification of the model comprises facilitating, by the computing device, specification of a model configured to model the one or more performance metrics based at least in part on a plurality of audiences on multiple web sites; and
the output bidding strategy directs bids to marketing options which result in different numbers of impressions of the advertisement to different numbers of audiences on various websites.

* * * * *